United States Patent [19]

Ito et al.

[11] Patent Number: 4,653,863

[45] Date of Patent: Mar. 31, 1987

[54] LIQUID CRYSTAL DISPLAY DEVICE HAVING LOUVERED FILTER AND STRIP ELECTRODES

[75] Inventors: Hiroshi Ito, Katsuta; Masaru Kugo, Ogawa, both of Japan

[73] Assignees: Hitachi, Ltd., Tokyo; Hitachi Automotive Engineering Co., Ltd., Ibaraki, both of Japan

[21] Appl. No.: 846,150

[22] Filed: Mar. 31, 1986

[30] Foreign Application Priority Data

Apr. 1, 1985 [JP] Japan .................................. 60-66498

[51] Int. Cl.⁴ ............................................... G02F 1/13
[52] U.S. Cl. ............................ 350/339 F; 350/339 R
[58] Field of Search ........................ 350/339 R, 339 F

[56] References Cited

U.S. PATENT DOCUMENTS

| 4,410,887 | 10/1983 | Stolov et al. | 350/339 F |
| 4,579,424 | 4/1986 | Matsukawa et al. | 350/339 F |
| 4,593,977 | 6/1986 | Takamatsu et al. | 350/339 F |
| 4,596,445 | 6/1986 | Fergason | 350/339 F |

*Primary Examiner*—John K. Corbin
*Assistant Examiner*—Richard F. Gallivan
*Attorney, Agent, or Firm*—Antonelli, Terry & Wands

[57] ABSTRACT

Color filters are provided on electrodes. The color filters and the electrodes are constituted by disposing a single strip electrode and filter in parallel and in the same direction. A glare protection filter is so provided as to be proximate to the front surface of the color filter. The glare protection filter includes minute louvers therein in parallel to each other. The direction of the louvers of the filter is perpendicular to that of the electrodes.

5 Claims, 6 Drawing Figures

LIQUID CRYSTAL DISPLAY DEVICE HAVING LOUVERED FILTER AND STRIP ELECTRODES

FIELD OF THE INVENTION

The present invention relates to a liquid crystal display device, and more particularly, to a variable color type liquid crystal display device which is capable of variegating its display letters or the like.

BACKGROUND OF THE INVENTION

There is a growing demand for electronic meters that utilize a fluorescent display tube, a light emitting diode or a liquid crystal rather than conventional mechanical meters.

For instance, a liquid crystal display device is disclosed in the specification of Japanese Patent Laid-Open No. 94739 in 1984.

In the prior art, electrodes and color filters provided on each electrode are formed by arranging a series of many strip electrode and filters in parallel and in the same direction for displaying a dotted image, and a polelizing film plate is provided on the front surface of the filters for preventing chromatic aberration of the filters.

When a variable color type liquid crystal display device is used for displaying a numeral and a letter of alphabet, electrodes and color filters are constituted by disposing a single strip electrode and filter in parallel and in the same direction.

These electronic display meters, however, have a defect wherein the light reflects on the windshield thereby to form an image on the line of driver's vision. This is commonly referred to as an "interference imaging phenomenon" which interferes with the driver's view of the road. As a countermeasure against the "interference imaging phenomenon" there has been proposed a method of providing a glare protection filter on the surface of a meter, which has already been disclosed in FIG. 4 of page 79 of NIKKEI MECHANICAL published on May 6, 1985.

However, when a glare protection is applied to a conventional variable color type liquid crystal display device used for indicating a numeral, interference streaks are produced in the direction in which the louvers of the filter are formed, thereby interfering with the driver's view of the road.

SUMMARY OF THE INVENTION

An object of the present invention is to provide a liquid crystal display device that prevents an "interference imaging phenomenon" and further a decline of visual recognizability, which decline is caused by the aforementioned interference streaks.

The foregoing object of the present invention is achieved by providing a liquid crystal display device defined as an improvement of a transparent liquid crystal display device constituted by forming stripped color filters on minutely stripped transparent electrodes which are formed within a liquid crystal cell, wherein the direction of strippes of segments of a liquid crystal display element and the direction of louvers of a glare protection filter are rendered vertical with a view to preventing the presence of interference streaks when disposing the glare protection filter which includes minute louvers incorporated thereinto.

DETAILED DESCRIPTION OF THE PREFERRED EMBODIMENTS

Figure 1:
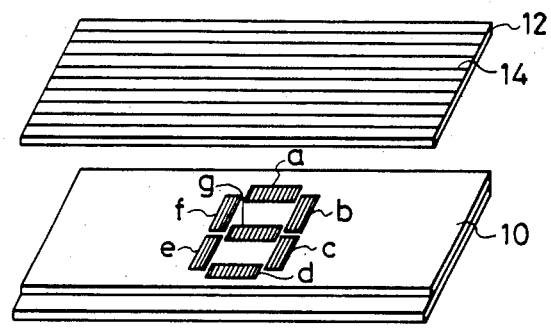
FIG. 1 is a view showing a fundamental structure of a liquid crystal display device according to the present invention.

Referring to FIG. 1, there are shown a liquid crystal display element 10 which is an essential feature of a liquid crystal display device according to the present invention and a glare protection filter 12 which is to be disposed on the front surface thereof. It can be observed through the Figure that the numeral 8 only appears on the surface of the liquid crystal display element 10 for simplifying the description.

It is commonly known that seven display segments a to g inclusive are provided on the surface of the liquid crystal display element 10 for the purpose of indicating numerals, letters of the alphabet or the like. The numerals and letters of the alphabet are variegated for display, this requiring such a step that the respective display segments are constituted by a plurality of minutely stripped color filters which are respectively disposed thereon. These color filters are capable of making display colors variable, the arrangement being such that each of the color filters is tinted in, for example, red, green and blue per row, and the forementioned numerals or letters of the alphabet are exhibited in desired colors according to combinations of pre-determined electric potentials.

Figure 2A:
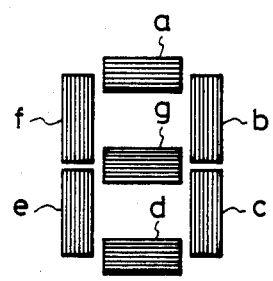
FIGS. 2(a) to 2(c) inclusive are views each showing arrangements of color filter and stripped electrodes which are formed on a liquid crystal display element of the liquid crystal display device shown in FIG. 1.
Figure 2B:
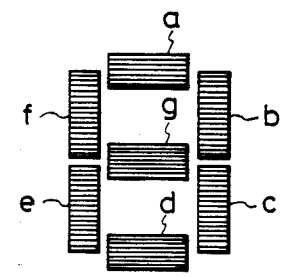
Figure 2C:
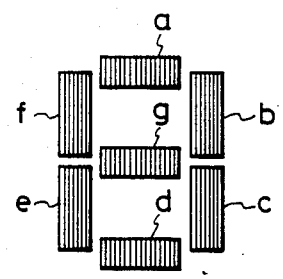

As regards disposition of the respective stripped electrodes, two methods can be considered. Namely, these stripped electrodes are, as shown in FIG. 2A, arranged in the longitudinal direction of the segments; and the other method is such that the respective segments are, as illustrated in FIGS. 2B and 2C, uniformly disposed in a lateral direction or a perpendicular direction regardless of the longitudinal direction thereof. With an experiment, the structure shown in FIG. 2A has, however, proved to be defective. To be specific, if the stripped electrodes are incorporated in the transparent type liquid crystal display device and are then combined with a glare protection filter 12 inclusive of loubers 14 disposed in the lateral direction as shown in FIG. 1, interference streaks are produced between the louvers 14 and the segments, a, d. g thereby to deteriorate its visual recognizability.

On the basis of such a fact, the stripped electrodes which form the display segments a to g inclusive are set in a single direction, whereas the glare protection filters which are to be disposed thereon are provided in such a manner that the louvers thereof are so aligned as to be perpendicular to the direction in which to dispose the stripped electrodes. To wit, it can be seen in FIG. 1 that the vertically stripped segments identical with those shown in FIG. 2C are to be combined with the glare protection filter 12 including the laterally stripped louvers 14 which are perpendicular thereto. However, if the display segments are constituted by the laterally stripped electrodes as shown in FIG. 2B, it will be obvious that a glare protection filter having perpendicularly stripped louvers is inevitably utilized, this being the reverse of the former.

Figure 3:
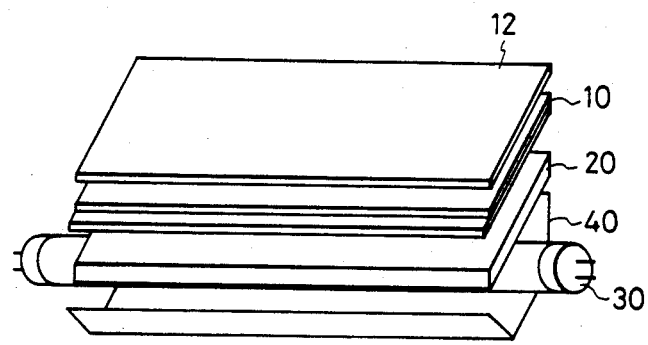
FIG. 3 shows a detailed configuration containing one electrode and one filter of the liquid crystal display device according to the present invention.

In the second place, a structure in which to apply the present invention to a transparent liquid crystal display device will hereinafter be described with reference to FIG. 3. As depicted in FIGS. 2B or 2C, a light-diffusion transparent plate 20 is provided on the rear surface of the liquid crystal display element 10 equipped with the display segments consisting of laterally or perpendicularly stripped electrodes; and further a fluorescent lamp 30 is provided on the rear surface of the light-diffusion transparent plate 20. The light emitted from the fluorescent lamp 30 reflects on a reflection plate 40 which is so provided as to surround the hemispherical surface of the lamp 30. A part of the reflected light is directly incident upon the light-diffusion transparent plate 20 where the light is diffused such as to entirely and evenly disperse behind the liquid crystal display element 10. By virtue of the thus scattered light, the numerals or the like formed on the liquid crystal display plate 10 are selectively displayed. In such a case, it is feasible to exhibit them in desired colors by making use of color combinations of color filters.

Figure 4:
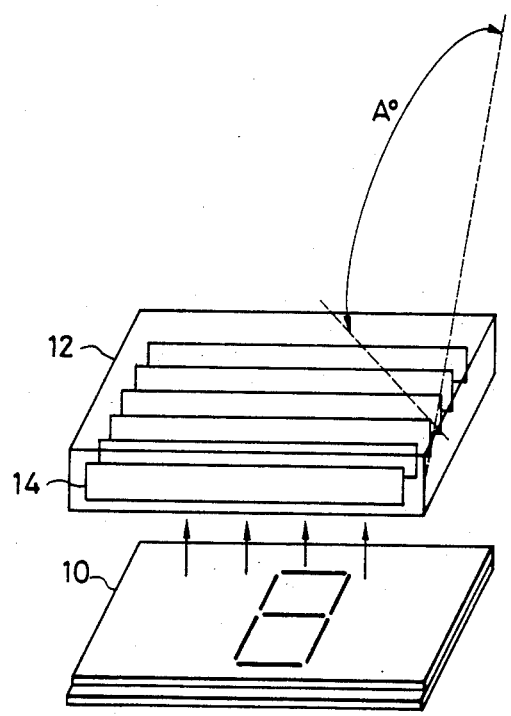
FIG. 4 shows a construction of a glare protection filter applied to the present invention and a function thereof.

The glare protection filter 12 is so provided as to be proximate to the front surface of the color liquid crystal display element 10. FIG. 4 depicts a function of this glare protection filter 12 with respect to the display element.

The glare protection filter 12 is enclosed in a transparent box which is sorrounded by six transparent plates. The glare protection filter 12 includes a plurality of minute louvers 14 incorporated thereinto in parallel to each other. The internal of each electrode, or fluorescent lamp 30 is narrower than that of each louver.

An expansion degree of the display light is adjusted within a range set by an angle A° by regulating an angle of the louvers 14 along the axisis of the louvers 14. With this arrangement, provided that the glare protection filter 12 is applied to, for instance, a vehicle display device or the like which is to be installed on the dashboard of an automobile, it is possible to prevent undesirable image formation in the driver's line of vision, viz., the so-called interference imaging phenomenon referable to the fact that the display light reflects on the windshield of the automobile. In the case of equipping an automobile or the like with the aforementioned filter, it is desirable that the glare protection filter is disposed such as to turn the louvers thereof to the lateral direction, this arrangement hindering the interference imaging phenomenon most effectively.

As described above, the stripped electrodes which constitute the display segments of the liquid crystal display element 10 are arranged to be perpendicular to the louvers 14 of the glare protection filter 12, this making it possible to prevent the creation of interference streaks which may be attributable to the parallel disposition of the louvers 14.

What we claim is:

1. A liquid crystal display device comprising a liquid crystal display element including display segments formed thereon which are constituted by a plurality of minutely transparent electrodes, said liquid crystal display element having color filters which are provided on said electrodes, characterized in that said electrodes and said color filters are constituted by disposing a single strip electrode and filter in parallel and in the same direction, a glare protection filter including minute louvers which are incorporated thereinto in parallel to each other, is so provided as to be proximate to the front surface of said liquid crystal display element, and said filter is disposed in such a manner that the direction of said louvers thereof is rendered perpendicular to the direction of said electrodes of said liquid crystal display element.

2. A liquid crystal display device as set force in claim 1, wherein the direction of said louvers incorporated into said filter is made lateral, whereas said electrodes of said liquid crystal display element are aligned vertically.

3. A liquid crystal display device as set forth in claim 1, wherein said louvers are enclosed in a transparent box which is sorrounded by six transparent plates.

4. A liquid crystal display device as set forth in claim 1, wherein said louvers are formed in such a manner that an expansion degree of the light of said display segments is adjusted by regulating an angle of said louvers along the axes of said louvers.

5. A liquid crystal display device as set forth in claim 1, wherein the interval of each electrode is narrower than that of each louver.

* * * * *